J. T. HELMS.
MECHANICAL MOVEMENT.
APPLICATION FILED MAY 17, 1912.
1,073,121.
Patented Sept. 16, 1913.
2 SHEETS—SHEET 2.
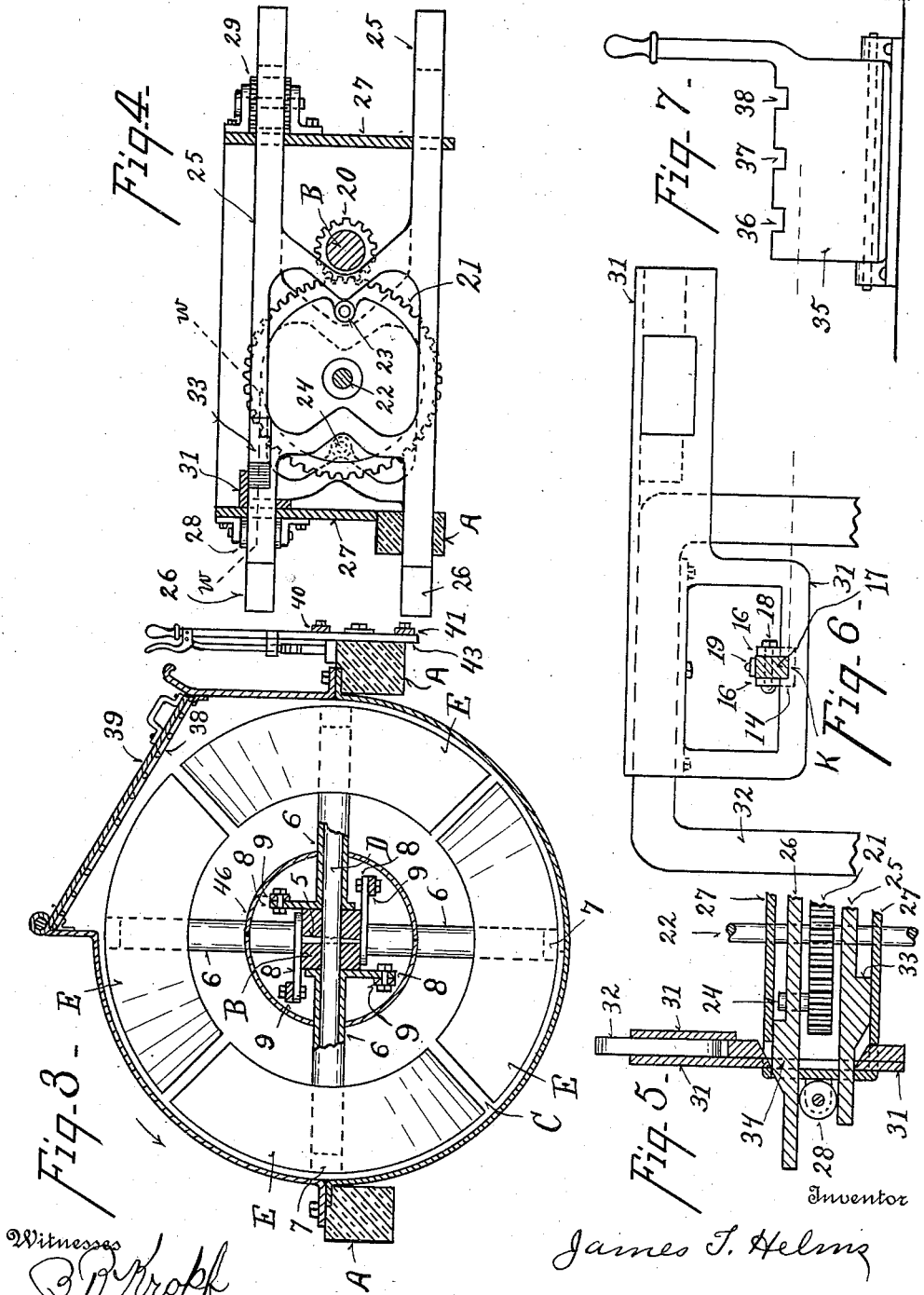
Witnesses
Inventor
James T. Helms
By C. W. Miles,
Attorney

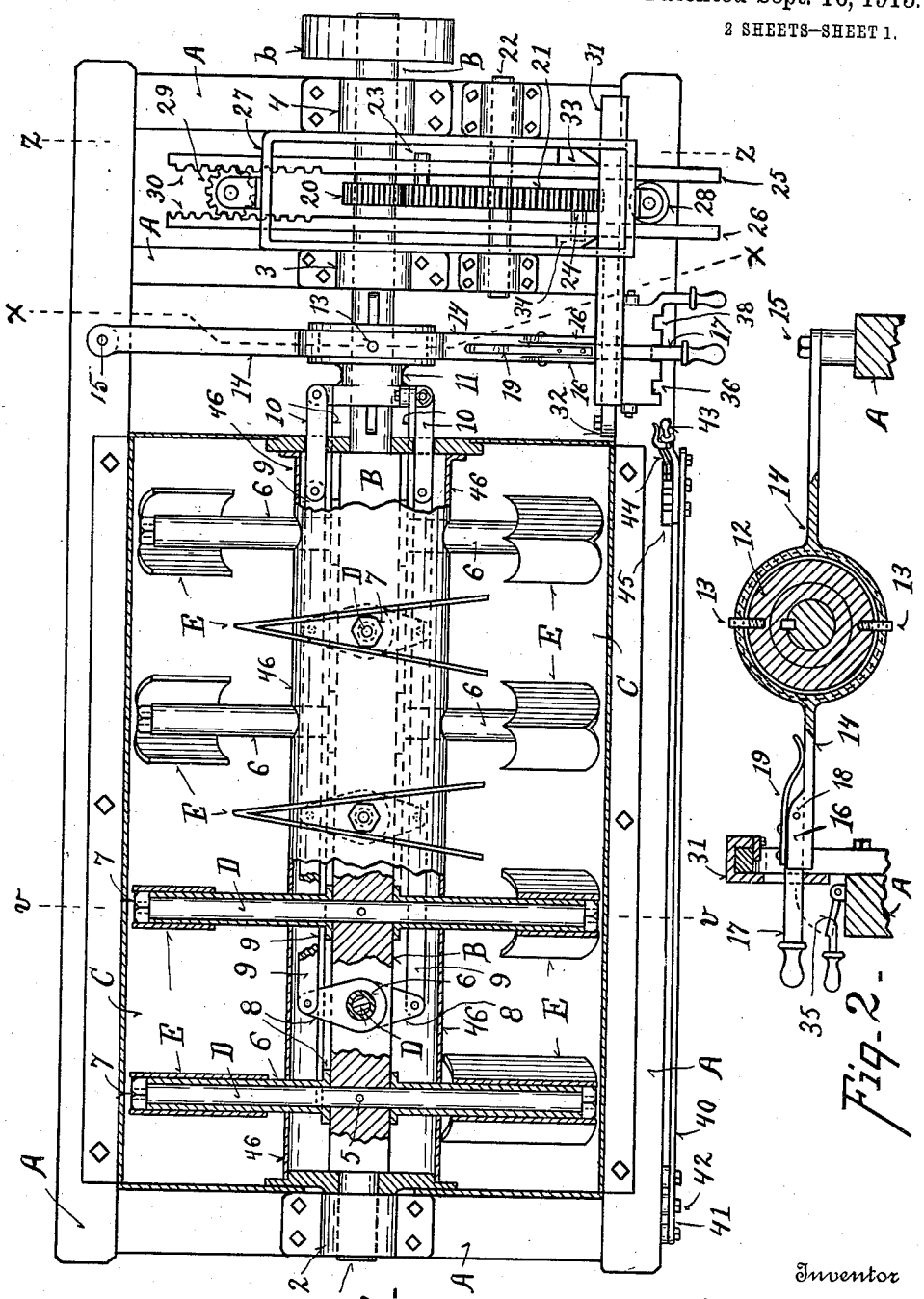

UNITED STATES PATENT OFFICE.

JAMES T. HELMS, OF LOCKLAND, OHIO.

MECHANICAL MOVEMENT.

1,073,121. Specification of Letters Patent. Patented Sept. 16, 1913.

Application filed May 17, 1912. Serial No. 697,911.

*To all whom it may concern:*

Be it known that I, JAMES T. HELMS, a citizen of the United States, residing at Lockland, in the county of Hamilton and State of Ohio, have invented certain new and useful Improvements in Mechanical Movements, of which the following is a specification.

My invention relates to improvements in mechanical movement.

One of its objects is to provide a mechanism adapted to be used as an air blower or ventilator with air as a propeller for boats when applied to water, and for mixing and kneading machines when applied to solids or semi-solids.

Another object is to provide an improved and simple mechanism in which the vanes or blades are under control of the operator to vary their angular adjustment or reverse their direction.

Another object is to provide means whereby the blades are automatically reversed at regular intervals.

Another object is to provide means whereby any of the foregoing movements or adjustments may be selectively employed at will.

My invention further comprises certain details of form, combination and arrangement, all of which will be fully set forth in the description of the accompanying drawings, in which:

Figure 1 is a top plan view, partly in section, of a mixing machine with the top section of the mixing chamber removed, embodying one form of my improved movement. Fig. 2 is a sectional detail through one of the shifting levers and its connections on line $x$ $x$ of Fig. 1. Fig. 3 is a vertical section on line $v$ $v$ of Fig. 1. Fig. 4 is a section through the shifting lever controlling mechanism on line $z$ $z$ of Fig. 1. Fig. 5 is a sectional detail on line $w$ $w$ of Fig. 4. Fig. 6 is a plan view of one of the shifting lever engaging members detached. Fig. 7 is a detail of the shifting lever locking member detached.

In the accompanying drawings representing one embodiment of my invention A represents the frame of a mixing machine.

B represents a shaft mounted in bearings 2, 3, 4.

C represents the mixing chamber, the top section of which has been removed in Fig. 1 to disclose the vanes or mixing blades. The portion of shaft B extending across the mixing chamber is square or polygonal in cross section, and is perforated at regular intervals alternately across its axis from different faces to receive cross bars D which are secured by pins 5 or other locking mechanism to the shaft B. Tubes or sleeves 6 are rotatably mounted upon opposite projecting ends of the cross bars D and locked in place by means of nuts 7 engaging the ends of the cross bars. The respective sleeves 6 are provided with crank arms 8 which are connected together in series by means of shifting rods, 9 running parallel with and close to the shaft B, and to which said crank arms are pivotally connected. The mixing blades or vanes E are connected to the outer ends of the respective sleeves 6, and for use in a mixer machine are preferably V-shaped with one arm of the V at each side of the sleeve 6. The vanes are curved to closely fit the interior of the hopper or mixing chamber. For use with air or water the vanes would be modified in shape to meet the conditions and requirements. If desired, the rear ends of the V-shaped vanes may be provided with cross braces to resist the external pressure.

The several shifting rods 9 are at one end connected by means of links 10 to a hub or collar 11 splined to shaft B and movable endwise thereon. A strap 12 seated in an angular groove in the hub 11 is provided with outwardly projecting studs 13 which are pivotally connected to the loop shaped central portion of a lever 14 which is pivotally connected to the frame at 15 and free to be moved at the opposite end by hand or power. The forward or free end of lever 14 has upwardly turned ears or flanges 16 forming a channel to receive a lever section 17 which is pivoted to lever 14 at 18 and is normally held downwardly by means of a spring 19.

When the lever 14 is shifted to the left hand, Fig. 1, the sleeve or collar 11 is also shifted in the same direction which shifts the several rods 9 endwise to the left which through the crank arms 8 causes the sleeves 6 to rotate upon the cross bars D so as to turn the forward end of the respective vanes to the left. When the lever 14 is shifted to a central position the points of the vanes are shifted into a plane with the axis of their respective cross bars D, and when the lever 14 is shifted to the right, the forward ends of the vanes are shifted to the right of their respective cross bars. Thus the vanes may be set so as to feed the material in the mixing chamber either to the right or left, or so as to stir it without feeding it either to the right or left. In practice I prefer to have a range of adjustment of the vanes so that they form either a right or left hand segmental spiral around the shaft.

In order to automatically and regularly shift the lever 14 when so desired I provide a pinion 20 on the shaft B which meshes with and drives a gear 21 mounted on a shaft 22. The gear 21 carriers a pair of cam rollers or studs 23 and 24, one on each side of said gear, which cam rollers respectively engage cam plates 25 and 26 which are mounted to slide in bearings in the frame piece 27. An antifriction roller 28 is mounted between the cam plates 25 and 26 at one end and a gear 29 is mounted between and engages racks 30 cut on the inner faces of said cam plates at the opposite end. The racks and pinion serve to equalize the strain on said cams, and insure one cam moving in the opposite direction to the other. A member 31 is slidably mounted upon the frame 27 and a bracket arm 32 projects therefrom, said member 31 being movable in a direction at right angles to the movement of the cam plates 25 and 26. Wedge shaped projections 33 and 34 carried by the respective cam plates 25 and 26 alternately engage corresponding faces on the members 31 to shift said member 31 backward and forward. The member 31 has a notch K into which the lever section 17 is adapted to engage to cause the lever 14 to be automatically and regularly shifted to change the adjustment of the vanes from right to left, to thoroughly mix the material in the mixing chamber. A pivotally mounted plate or member 35 is provided with three notches 36, 37, 38 each of which is adapted to engage the lever section 17 when the member 35 is thrown to a vertical position, and to lift said lever section 17 against the action of its spring 19 sufficiently to disengage the section 17 from the notch K of member 31, and to hold the lever 14 and the vanes to one position of adjustment, until the member 31 is lowered to a horizontal position, the position of the vanes depending upon the notch of member 31 engaged by lever section 17.

The material to be mixed is adapted to be fed into the mixing chamber through a screened opening 38 which may be covered if desired by a lid 39. A discharge gate at the end of the mixing chamber is opened and closed as desired by means of rods 40, 41, connected at one end to a double crank arm on the axis 42 of the gate and at the opposite end to a pivoted lever 43 having a latch 44 engaging a notched segment 45 by means of which the gate can be locked to open or closed position.

I preferably provide a sectional detachable housing 46 for that portion of the shaft within the mixing chamber, said housing also covering and protecting the crank arms 8 at the inner ends of the sleeves 6 and also the shifting rods 9 and their connections.

The mechanism herein illustrated and described is capable of considerable modification without departing from the principle of my invention.

Having described my invention what I claim is—

1. A mechanical movement comprising a rotatable shaft having a rigid cross bar, tubular members provided with crank arms and rotatably mounted upon said cross bar on opposite sides of said shaft, shifting rods rotatable with said shaft and substantially parallel therewith and connected to said crank arms, and means operable while said shaft is rotating to adjust said tubular members.

2. A mechanical movement comprising a rotatable shaft having a cross bar, a plurality of tubular members rotatably mounted upon said cross bar on opposite sides of said shaft, shifting rods carried by and rotatable with said shaft and engaging said tubular members to rotatively adjust them relative to said cross bar, and means operable while said shaft is rotating to adjust said tubular members through said shifting rods.

3. A mechanical movement comprising a rotatable shaft having a rigid cross bar, a plurality of tubular members rotatably mounted upon said cross bar on opposite sides of said shaft, mechanism rotatable with said shaft to rotatably adjust said tubular members relative to said cross bar while said shaft is rotating, and means to lock said mechanism in its adjusted position.

4. A mechanical movement comprising a rotatable shaft having a plurality of rigid cross bars, a plurality of angularly adjustable members rotatably mounted upon said cross bars, and capable by changing their adjustment of forming either right or left hand spirals about said shaft, mechanism rotatable with said shaft to rotatably adjust said angularly adjustable members relative to said cross bars, and means to lock said adjusting mechanism to its adjusted positions.

5. A mechanical movement comprising a rotatable shaft having a plurality of rigid cross bars, a plurality of angularly adjustable members rotatably mounted upon said cross bars and adjustable thereon to form either a right or left hand spiral about said shaft, and mechanism controlled by the movements of said shaft to adjust said angularly adjustable members relative to said cross bars to alternately form said members into right and left hand spirals about said shaft.

6. A mechanical movement comprising a rotatable shaft, a plurality of angularly adjustable members mounted upon and adjustable relative to said shaft to form either a right or left hand spiral about said shaft, mechanism to adjust said angularly adjustable members while said shaft is rotating, and means to lock said angularly adjustable members to their adjusted positions relative to said shaft.

7. A mechanical movement comprising a rotatable shaft, a plurality of angularly adjustable members mounted upon and adjustable relative to said shaft to form either a right or left hand spiral about said shaft and to intermediate positions, mechanism to adjust said angularly adjustable members, and means to lock said angularly adjustable members to their adjustable positions relative to said shaft.

8. A mechanical movement comprising a rotatable shaft, a plurality of angularly adjustable members mounted upon said shaft and adjustable relative to said shaft to form either a right or left hand spiral about said shaft and to intermediate positions, and mechanism to adjust said angularly adjustable members relative to said shaft while said shaft is rotating to alternately form said angularly adjustable members into right and left hand spirals about said shaft.

9. A mechanical movement comprising a rotatable shaft, a plurality of angularly adjustable members mounted upon said shaft and adjustable relative thereto to varying degrees of right and left hand angularity relative to the path of travel, lever mechanism rotatable with said shaft to simultaneously adjust said several angularly adjustable members, a stationarily mounted actuating member to actuate said lever mechanism while said shaft is rotating, and means to lock said angularly adjustable members to their adjusted positions relative to said shaft.

10. A mechanical movement comprising a rotatable shaft, a plurality of angularly adjustable members mounted upon and adjustable relative to said shaft to form either a right or a left hand spiral about said shaft, and mechanism controlled by the movements of said shaft to adjust said angularly adjustable members relative to said shaft to alternately form said members into right and left hand spirals about said shaft.

11. A mechanical movement comprising a rotatable shaft, a plurality of angularly adjustable members mounted upon said shaft and adjustable relative thereto to varying degrees of right and left hand angularity relative to the path of travel, connecting levers to simultaneously adjust said respective angularly adjustable members, and cam mechanism movable in unison with said shaft to alternately adjust said angularly adjustable members to right and left of the path of travel.

12. A mechanical movement comprising a rotatable shaft, a plurality of angularly adjustable members mounted upon said shaft and adjustable relative thereto to varying degrees of right and left hand angularity relative to the path of travel, connecting levers rotatable with said shaft to simultaneously adjust said respective angularly adjustable members, an da pair of cams actuated in unison with the movements of said shaft to alternately and automatically adjust said angularly adjustable members to the right and left of the path of travel.

In testimony whereof I have affixed my signature in presence of two witnesses.

JAMES T. HELMS.

Witnesses:
E. W. McCALLISTER,
C. W. MILES.